United States Patent [19]

Galluzzo et al.

[11] Patent Number: 4,552,538

[45] Date of Patent: Nov. 12, 1985

[54] MULTIDIRECTIONAL AMPHIBIOUS SAFETY VEHICLE

[76] Inventors: Vincent Galluzzo; Angela Galluzzo; Victor T. Galluzzo, all of 8548 Oakleigh Rd., Baltimore, Md. 21234

[21] Appl. No.: 600,402

[22] Filed: Apr. 16, 1984

[51] Int. Cl.⁴ .............................................. B63H 5/00
[52] U.S. Cl. ....................................... 440/99; 416/84; 114/270; 114/59
[58] Field of Search .............................. 440/99, 98, 100; 114/270, 59, 350; 280/206; 416/84

[56] References Cited

U.S. PATENT DOCUMENTS

| | | | |
|---|---|---|---|
| 271,203 | 1/1883 | Lowe | 440/99 |
| 475,172 | 5/1892 | Uhl | 440/99 |
| 520,899 | 6/1894 | Ronk | 440/89 |
| 709,417 | 9/1902 | Mayo | 114/350 |
| 1,052,323 | 2/1913 | Davis | 114/350 |
| 1,104,387 | 7/1914 | Razniak | 114/350 |
| 1,244,020 | 10/1917 | Bodnar | 114/350 |
| 1,296,646 | 3/1919 | Georgelis | 440/99 |
| 2,011,045 | 8/1935 | Fitzgibbon | 440/98 |
| 2,308,838 | 1/1943 | Thompson | 440/99 |
| 2,838,022 | 6/1958 | Wilson | 441/78 |
| 3,333,563 | 8/1967 | Bakker | 114/270 |
| 3,934,291 | 1/1976 | Hagen | 441/78 |

FOREIGN PATENT DOCUMENTS 509965  3/1952  Belgium .............................. 440/99

*Primary Examiner*—Trygve M. Blix
*Assistant Examiner*—Edwin L. Swinehart
*Attorney, Agent, or Firm*—Joseph Scafetta, Jr.

[57] ABSTRACT

A multidirectional amphibious safety vehicle comprises an outer cylindrical shell having two opposite ends and a longitudinal axis therethrough; a stationary central pipe having two opposite ends and extending along the longitudinal axis of the outer cylindrical shell; elements, secured around the central pipe, for rotating the outer cylindrical shell about the central pipe whereby the safety vehicle moves forward and backward over land, water, and other terrain; and a motor, mounted on at least one of the two opposite ends of the central pipe, for driving the safety vehicle sideways on water.

10 Claims, 7 Drawing Figures

MULTIDIRECTIONAL AMPHIBIOUS SAFETY VEHICLE

BACKGROUND OF THE INVENTION

1. Field of the Invention

The present invention relates to vehicles which are capable of traveling over land, water, ice, or snow and which are capable of moving forward, backward, or sideways.

2. Description of the Prior Art

It is generally known that automobiles travel either forward or backward over land and that boats travel only forward on water. However, because of the conventional shape of boats, they have generally not been able to move backward or sideways on water. Even though some military amphibious vehicles have been able to travel over both land and water, they too have not been able to move either backward or sideways on water.

Nevertheless, vehicles capable of moving either forward or backward on water have been developed. For example, in U.S. Pat. No. 3,934,291, issued in 1976, Hagen proposed a unitary hollow paddle wheel composed of two circular pneumatic tubes supporting a tread therebetween for operation by a person within the wheel. Also, in U.S. Pat. No. 2,838,022, issued in 1958, Wilson proposed a spherical water craft having an exterior annular series of paddles responsive to walking motion of a user within a hull of the craft. Although the vehicles of both Hagen and Wilson are capable of moving either forward or backward on water, they are both not capable of moving sideways and are also not intended for traveling over land.

Safety vehicles having a cylindrical shape and being designed for a life-saving function are disclosed by U.S. Pat. No. 1,244,022 issued in 1917 to Bodnar and U.S. Pat. No. 1,052,323 issued in 1913 to Davis. However, the vehicles of both Bodnar and Davis move only in the forward direction on water and are not capable of moving either backward or sideways. Likewise, because of the peculiar shapes of the bottoms of these two cylindrical vehicles of Bodnar and Davis, they are not able to travel over land.

Of more general interest is U.S. Pat. No. 520,899 issued in 1894 to Ronk for an aquatic bicycle in which pneumatic wheels are used with paddles attached to an exterior rim for propelling the craft through water. A platform for a passenger in the nature of a swinging carriage is suspended from a central shaft. A chain driven by either hand or electricity around sprocket wheels provide the power mechanism for the craft. This particular prior art device, although employing some of the same features as the present invention, moves only forward on water and is not multidirectional over both land and water.

SUMMARY OF THE INVENTION

The primary object of the present invention is to provide a safety vehicle which is multidirectional, i.e. capable of moving forward, backward or sideways, and amphibious, i.e. capable of traveling over land, water, ice, or snow.

Generally, the safety vehicle of the present invention is characterized by an outer cylindrical shell having a longitudinal axis therethrough; a stationary central pipe having two opposite ends and extending along the longitudinal axis of the outer cylindrical shell; a control unit and a circular frame secured around the central pipe in order to rotate the outer cylindrical shell about the central pipe so that the safety vehicle moves forward and backward over land, water, and other terrain; and a motor mounted on at least one of the two opposite ends of the central pipe so that the safety vehicle moves sideways on water.

Other objects and advantages of the present invention will become more readily apparent from a careful review of the drawings described immediately hereinbelow and from a study of the description of the preferred embodiment given thereinafter.

DESCRIPTION OF THE PREFERRED EMBODIMENT

Figure 1:
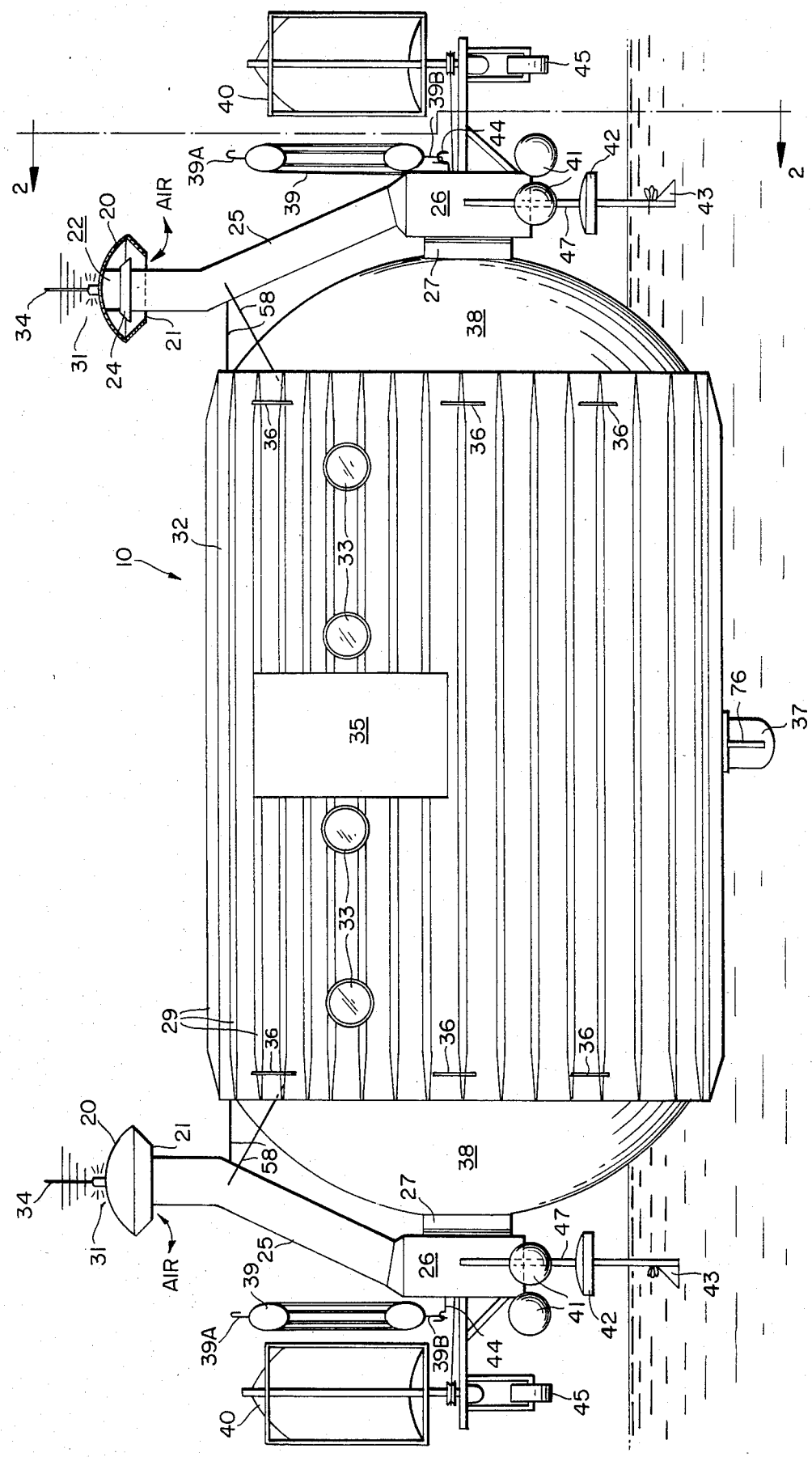
FIG. 1 is a front elevational view of the safety vehicle of the present invention.

The invention is best understood by referring to the drawings wherein an multidirectional amphibious safety vehicle 10 is generally shown. For the sake of orientation, the forwarding direction is considered to be up out of the plane of the paper illustrating FIGS. 1 and 3, the backward direction is considered to be down into the plane of the paper showing FIGS. 1 and 3, and the sideway direction is considered to be to the left and right hand sides of the paper showing FIGS. 1 and 3. As shown in FIG. 1, ventilation is provided to the safety vehicle 10 through two external caps 20. Air enters each cap 20 through the underside opening 21 and then passes through an internal opening 22 inside the cap 20. A flange 24 prevents water from entering the internal opening 22. The air is then drawn into pipe section 25 by a blower (not shown) contained in a box section 26. The blower in the box section 26 then circulates air into pipe section 27 which feeds such air directly into the inside of the safety vehicle 10, as will be shown later in FIG. 3. On top of the external cap 20, there is shown a warning/locator light 31 and a transmitting/receiving radio antenna 34.

The safety vehicle 10 is composed of an internal non-revolving living section 30, best shown in FIG. 3, and a revolving outer cylindrical shell (hereinafter cylinder) 32, shown in both FIGS. 1 and 3, extending substantially the entire length of the safety vehicle 10. Referring again to FIG. 1, the outer cylinder 32 has a plurality of external corrugations 29, a plurality of port holes 33, and a door 35 which may be secured either from the inside or from the outside. Corrugations 29 have been removed from the door 35 simply for the sake of clarity. Ordinarily, when the safety vehicle 10 is traveling over land, the corrugations 29 provide traction for the safety vehicle 10. A plurality of hand ropes 36 is also provided for aiding a person climbing along both edges of the outer cylinder 32. A keel 37 for guiding the safety vehicle 10 is fixed on the underside of the outer cylinder 32 but may be tilted out of the way, in a manner to be explained later, when it is desired to rotate the outer cylinder 32 over water.

Domes 38 are mounted at both ends of the safety vehicle 10 and are made of unbreakable transparent plexiglass or plastic so that passengers can both see out and be seen from the outside.

A block and tackle 39 has a hook 39A at its top end for lowering the safety vehicle 10 from a ship, an oil rig, or the like. A hook 39B at the bottom end of the block and tackle 39 engages a hook 44 for releasing the safety vehicle 10 from the block and tackle 39 after the safety vehicle 10 has reached the water level below the ship, oil rig, or the like.

Sails 40, mounted on both ends of the safety vehicle 10, may be used to help move the safety vehicle 10 sideways and are shown in a substantially reduced size from their true size, relative to the size of the safety vehicle 10.

Figure 2:
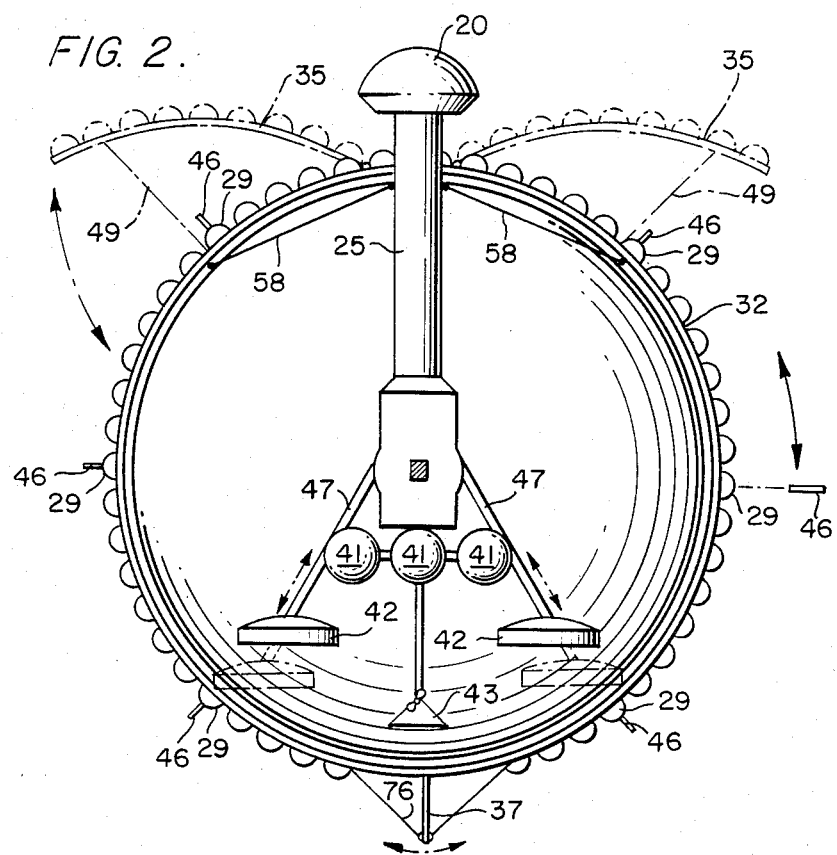
FIG. 2 is a side elevational view taken along line 2—2 of FIG. 1.

As best shown in FIG. 2, floats 41 and pontoons 42 rise and fall with the change in the water level caused by any change in the weight of the safety vehicle 10 and basically keep the safety vehicle 10 in balance while in water. Hydraulic arms 47 raise and lower the pontoons 42 in response to this change in the water level. The floats 41, pontoons 42, and hydraulic arms 47 are all mounted on opposite ends of the safety vehicle 10.

Small motors 43 are also mounted at opposite ends of the safety vehicle 10 in order to drive such safety vehicle 10 sideways. Although only one small motor 43 is shown in FIG. 2, it should be clear from FIG. 1 that either one or both small motors 43 may be reoriented to drive the safety vehicle 10 in either one or an opposite direction at different times.

Returning to FIG. 2, it may be seen that spikes 46 may be screwed into or otherwise secured to each of the corrugations 29 in order to assist movement of the safety vehicle 10 when it is travelling over ice or snow. Although only six such spikes 46 in corrugations 29 are shown, it should be clear that all such corrugations 29 along the outer cylinder 32 are capable of holding the spikes 46.

Rods 49 hold the doors 35 open whenever passengers are entering and exiting from the safety vehicle 10 or whenever passengers are fishing, crabbing, or performing similar activities, while awaiting rescue in the water.

Figure 3:
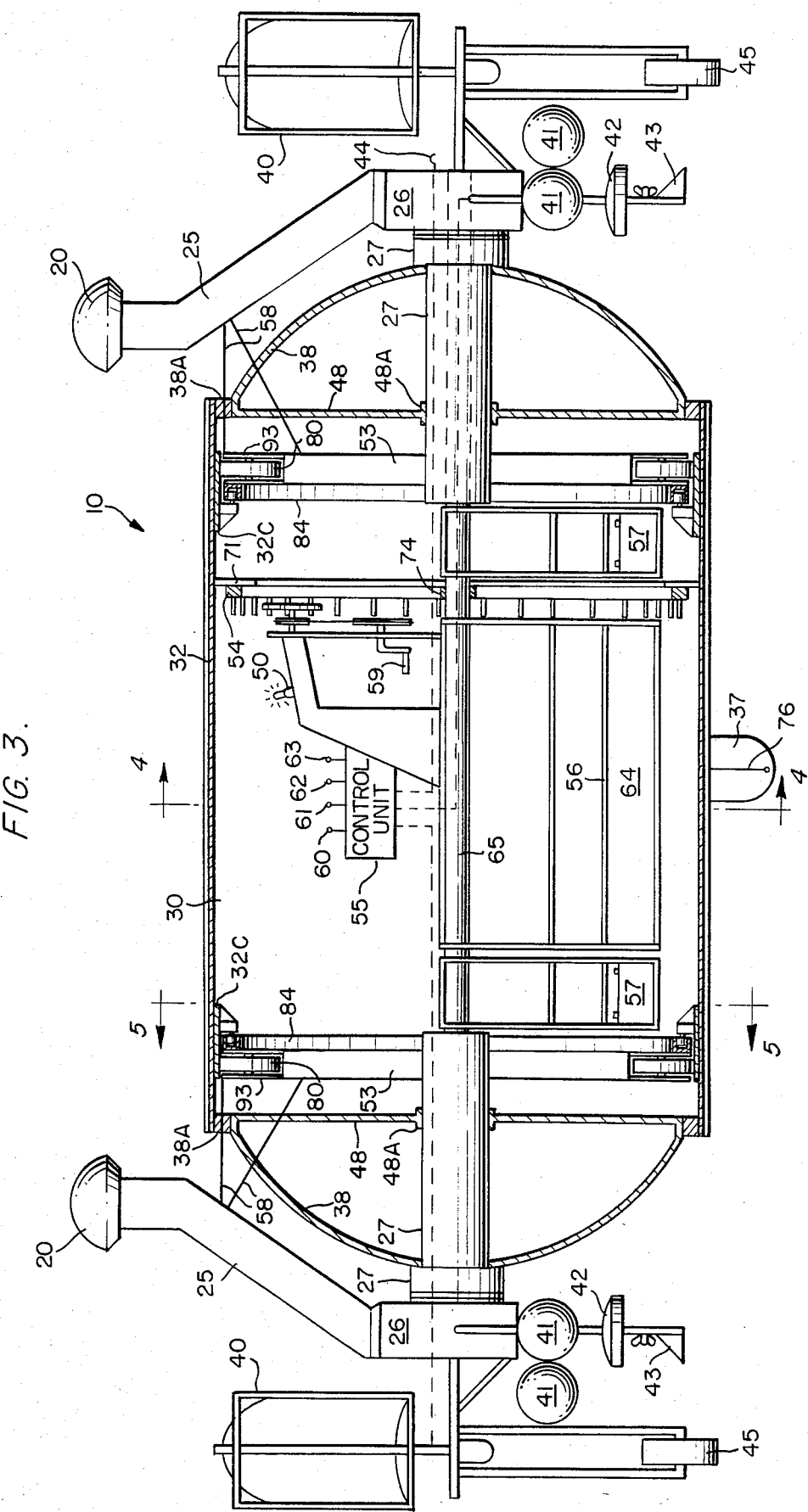
FIG. 3. is a longitudinal cross-sectional view of the invention.

As best shown in FIG. 3, small auxiliary rubber wheels 45 are lowered to the ground level from the opposite ends of the safety vehicle 10 for providing balance whenever the safety vehicle 10 is travelling over land, ice, or other terrain.

As mentioned earlier during the discussion of FIG. 1, air enters the water safety vehicle through a pipe section 27. Usually, the blower (not shown) in one box section 26 is drawing fresh air into the living section 30 while a blower (not shown) in the box section 26 at the opposite end of the safety vehicle 10 is expelling bad air out of the living section 30.

A solid wall 48, made of unbreakable transparent plastic or plexiglass, is secured at its outer circumferential edge to the periphery of the circumferential edge of the dome 38. At its inner circumferential edge, the solid wall 48 provides a flange 48A through which the pipe section 27 passes so that air may pass into and go out of the living section 30.

A plurality of stationary frames 53, only two of which are shown in FIG. 3, is secured at the inner end around the circumference of the air pipe section 27. Each frame 53 spaces a plurality of rotating large idle rollers 80 and a nonrotating track 84, attached at its outer end, from the air pipe section 27. The operation of the rotating large idle rollers 80 and the nonrotating track 84 will be discussed later in reference to FIGS. 5-7. However, it may be said at this time that, basically, the rotating large idle rollers 80 and their accompanying elements provide means for counterbalancing the rotation of the outer cylinder 32 so that the internal living section 30 and various central elements passing therethrough do not also rotate with the outer cylinder 32.

Three rods 58, only two of which are shown on each end of the vehicle 10 in FIG. 3, pass through a watertight packing 38A and secure the ventilation pipe section 25 to braces 93 connected to the stationary frames 53. The attachment of these rods 58 to the frame 53 will be better understood by viewing FIGS. 1, 2, 6, and 7 together in which the rods 58 are shown in various other views.

Figure 4:
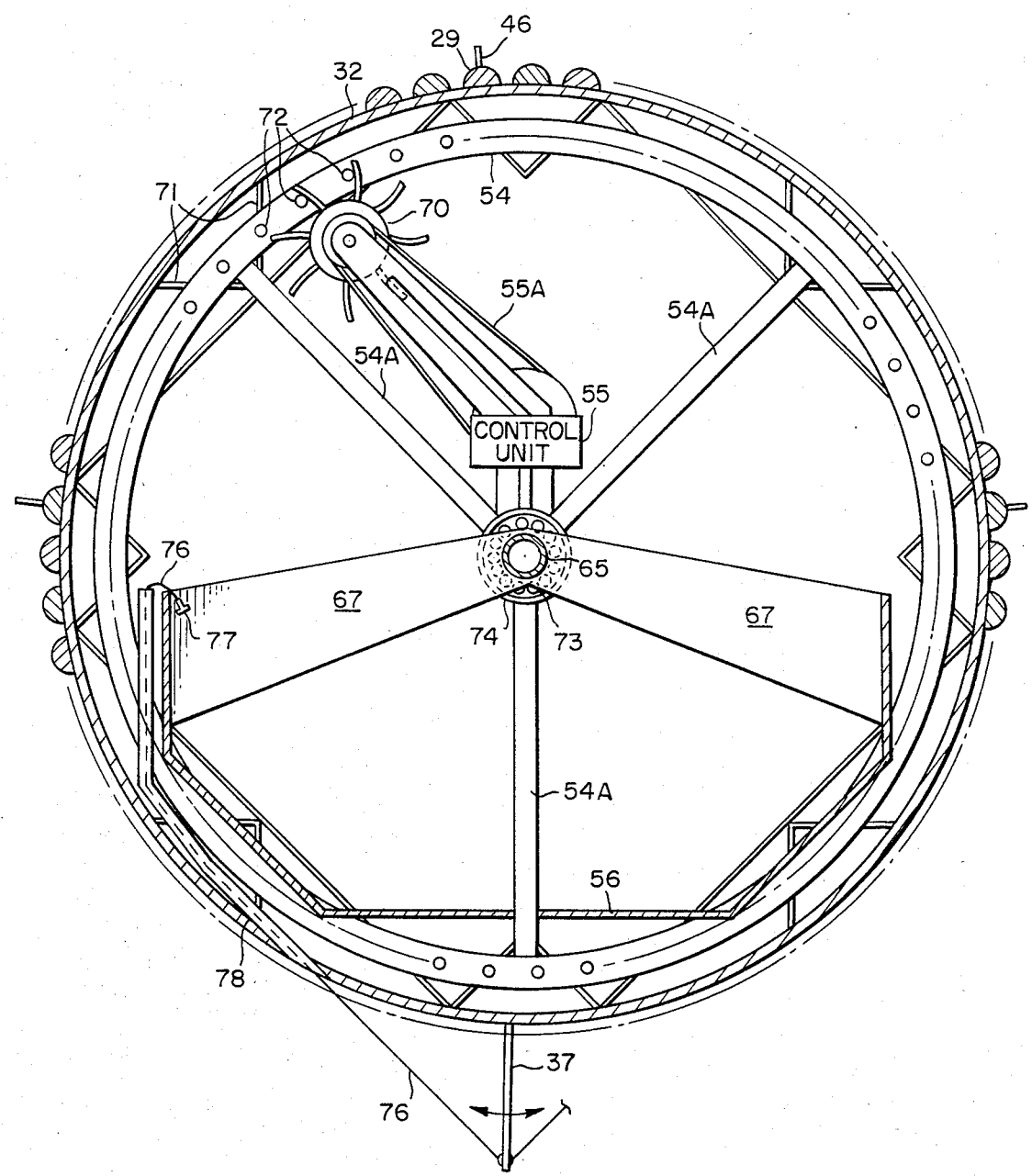
FIG. 4 is a transverse cross-sectional view taken along line 4—4 of FIG. 3.

As shown in FIGS. 3 and 4, a circular frame 54, attached to the inner periphery of the outer cylinder 32, causes rotation of the outer cylinder 32 in a manner to be described hereinafter. Control unit 55 contains a plurality of levers 60-63 for manipulating various elements already discussed hereinabove. For example, lever 60 controls the sails 40, lever 61 controls the small motors 43, and lever 62 controls the hook 44 for releasing the block and tackle 39 (omitted from FIG. 3 for the sake of simplicity but shown in FIG. 1). Lever 63 controls the rotation of the outer cylinder 32 while other levers (not shown) control the raising and lowering of the small wheels 45, etc. The cables or electrical wires connecting the levers 60-63 to the various elements which they control may pass through the inside or be attached to the outside of a nonrotating central pipe 65, to be discussed in more detail later.

Passengers may stand or sit upon a platform 56 under which batteries 57 are stored for providing electrical energy to the outside light 31 shown only in FIG. 1, an inside light 50 shown only in FIG. 3, the radio antenna 34 shown only in FIG. 1, and any other electrical apparatus requiring electricity on the vehicle 10. Storage area 64 is also provided under the platform 56 for supplies such as food, water, medicine, etc.

A manually operated handle 59, shown only in FIG. 3, is provided for rotating the circular frame 54 in order to turn the outer cylinder 32. However, this handle 59 is used only in the event that either the lever 63 on the control unit 55 is out of order or the batteries 57 are dead.

The hollow stationary central pipe 65 extends completely along the longitudinal axis of the safety vehicle 10 and is the key element about which the outer cylinder 32 rotates. The various stationary elements, such as frames 53, are secured about this central pipe 65.

Referring now to FIG. 4, the circular frame 54 is shown being rotated by the lever 63 (FIG. 3 only) on the control unit 55 so that outer cylinder 32 also rotates with the circular frame 54. A plurality of diagonal braces 54A secure the circular frame 54 around the central pipe 65.

Support arms 67 are secured to the outer circumference of the central pipe 65 and carry the platform 56 as a swinging cradle upon which the passengers may sit or stand. Spider 70 is operated by control unit 55 through a chain and pulley assembly 55A and interacts with the plurality of pins 72 to cause rotation of the circular frame 54 which carries with it the outer cylinder 32. Cross braces 71 connect the circular frame 54 to the outer cylinder 32 so that the frame 54 and the cylinder 32 rotate together. However, before rotation is commenced, it is necessary to tilt the keel 37 so that it lies substantially flush against the outer wall of the rotating cylinder 32. The keel 37 is tilted by pulling on handle 77 so that cable 76, which extends through pipe 78, may tilt the keel 37 in a desired direction. In FIG. 4, only one set of the cable 76, handle 77, and pipe 78 is shown but a corresponding set is arranged on the other side of the safety vehicle 10 for tilting the keel 37 in the opposite direction. The direction in which the keel is tilted will depend upon the direction in which the outer cylinder 32 is rotated. In all cases, the keel 37 should be tilted so that the lower end of the keel 37 is the last part thereof to be rolled over when the outer cylinder 32 is rotating either in the water or on terrain. The keel 37 and the cable 76 are shown in side views in FIGS. 1 and 3 while FIG. 2 shows another cross-sectional view of the keel 37 and the cable 76.

As shown best in FIG. 4, bearings 73, around which the circular frame 54 and its diagonal braces 54A rotate, are contained in a bearing casing 74 arranged around the outside of the central pipe 65.

Figure 5:
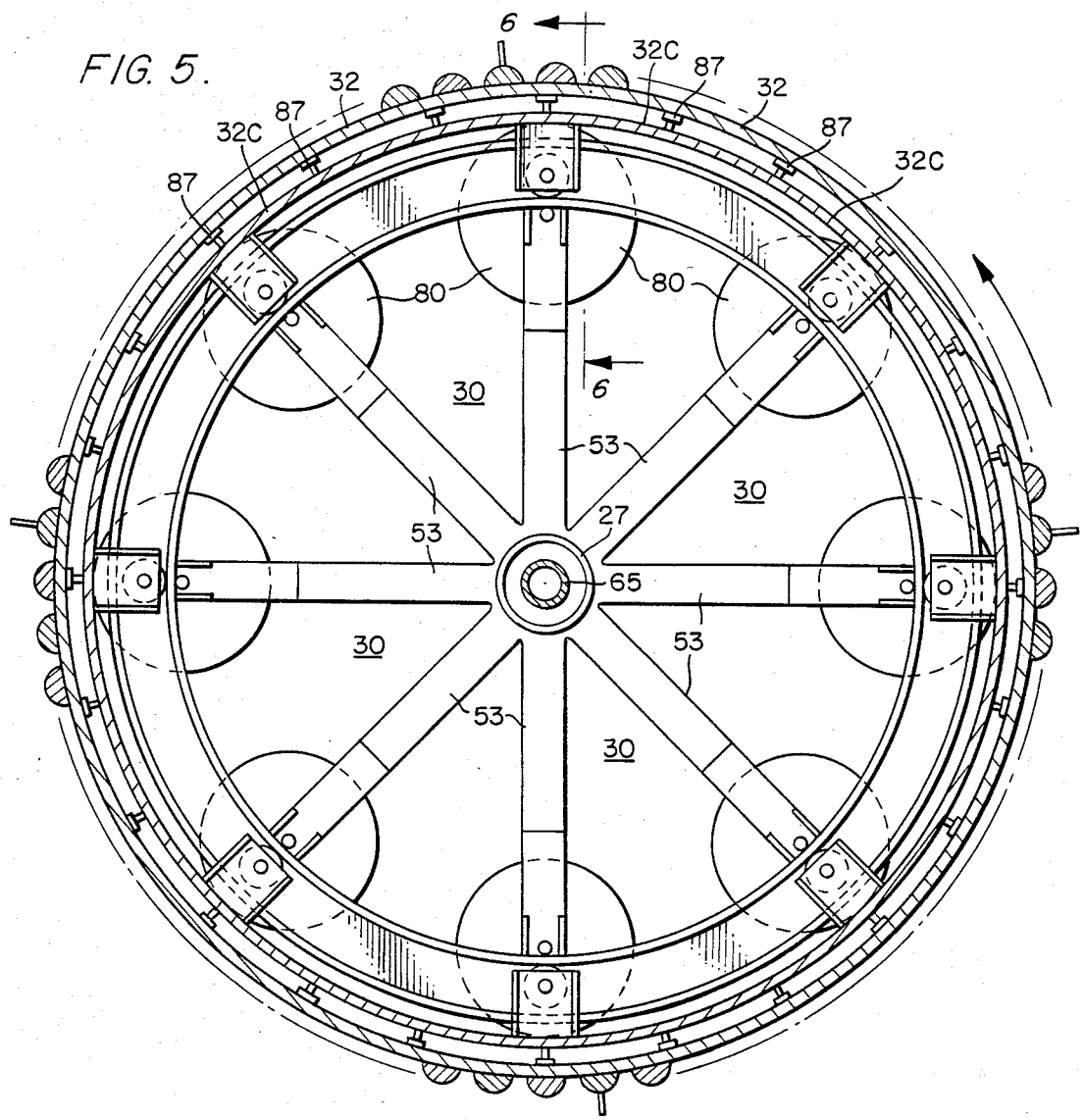
FIG. 5 is a transverse cross-sectional view taken along line 5—5 of FIG. 3.

In FIG. 5, details of the relationship of the frame 53 to the nonrotating cylindrical living section 30 are shown. The plurality of large idle rollers 80 turn against the inside surface of a short rotating cylindrical roll section 32C which is securely attached to the outer rotating cylinder 32 by spacers 87. As indicated above during the discussion of FIG. 3, the frame 53 is secured at its inner end around the periphery of the air pipe section 27. The smaller central pipe 65, shown in FIGS. 3 and 4, also passes through the air pipe section 27 in order to carry cables and the like from one end of the safety vehicle 10 to the other end. Both the central pipe 65 and the air pipe section 27 are stationary and do not rotate.

Figure 7:
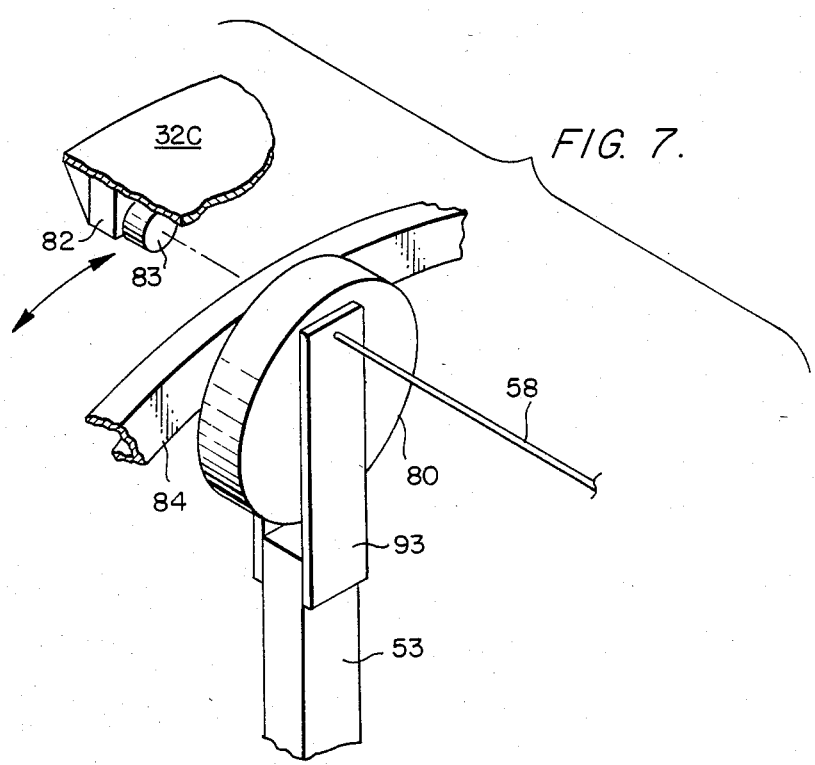
FIG. 7 is a partially exploded perspective view of the idle roller element shown in FIG. 6.
Figure 6:
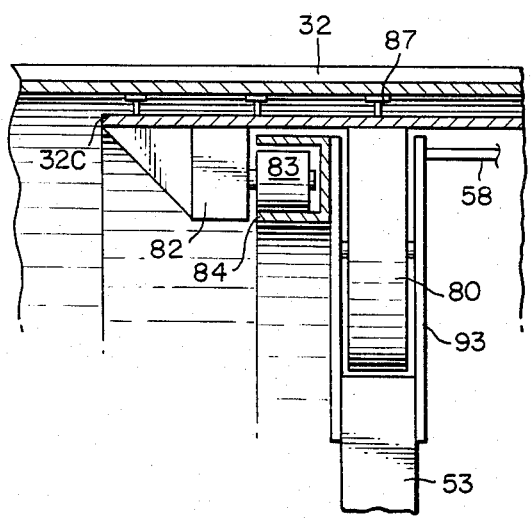
FIG. 6 is a partially broken away vertical cross-sectional view taken along line 6—6 of FIG. 5.

As best shown in FIG. 6, support boxes 82 are attached to the inside of the short revolving cylindrical roll section 32C. A plurality of small wheels 83 is secured to the support boxes 82 and travel in the nonrotating track 84 around the inner circumference of the revolving cylindrical roll section 32C. FIG. 7 shows these same elements in a perspective view. The spacers 87 are shown in FIGS. 5 and 6 but are omitted for sake of clarity from FIGS. 3 and 7. As indicated above, the spacers 87 connect the outer revolving cylinder 32 and the inner revolving cylindrical roll section 32C securely together.

A description of the operation of the invention follows. The safety vehicle 10 is intended generally, when not in use, for hanging by the block and tackle 39 from the side of an oceantraveling ship, an oil rig in a frozen tundra, or any other largescale operational apparatus in a hostile environment from which passengers or workers may need to escape in a hurry.

As shown in FIG. 1, such passengers or workers enter the safety vehicle 10 through door 35. As shown in FIG. 3, one person manipulates lever 62 on control unit 55 to lower the safety vehicle 10 into the water, if the safety vehicle 10 is attached to a ship or an oil rig, or onto the ground or ice, if the safety vehicle 10 is attached to an oil rig or another type of high platform.

The lever 62 is further manipulated so that hook 44 detaches the safety vehicle 10 from the block and tackle 39 which remains attached to the ship, oil rig, or the like.

If the safety vehicle 10 is lowered into water, the operator manipulates the lever 63 on control unit 55 to cause, as best shown in FIG. 4, the chain and pulley assembly 55A to turn spider 70 against pins 72 on circular frame 54 so that, due to the interconnection of circular frame 54 to outer cylinder 32, the outer cylinder 32 rotates. Corrugations 29 act as a series of small paddles which are capable of moving the safety vehicle 10 very quickly away from the scene of a disaster. Once the safety vehicle 10 is at a safe distance away from the ship or oil rig, rotation of the outer cylinder 32 may be ceased and the safety vehicle 10 may then be maneuvered sideways. This sideways movement is accomplished by first tilting the keel 37 downwards by pulling on handle 77 which controls keel 37 through cable 76. Referring back to FIG. 3, lever 60 on control unit 55 may then be manipulated to operate both sails 40. At the same time or shortly thereafter, lever 61 is manipulated to orient both motors 43 in the same direction before starting them.

If the safety vehicle 10 is lowered onto the ground, the operator initiates rotation of the outer cylinder 32 in the same manner as described in the immediately preceding paragraph. However, additionally, the operator manipulates another lever (not shown) on control unit 55, in order to lower the wheels 45 to the ground.

If, when the safety vehicle 10 is traveling over ground, it encounters a long stretch of snow or ice, such as a frozen tundra, the operator may stop the rotation of the outer cylinder 32 as shown in FIG. 2, get out of the safety vehicle 10 through door 35, and insert a plurality of spikes 46 in the plurality of corrugations 29 in order to aid the traction of the safety vehicle 10.

The operation and elements of the single preferred embodiment described above are considered to be illustrative only since other modifications will be readily discerned by those skilled in the pertinent technology. For example, whereas the control unit 55 is shown in FIG. 3 as rotating the outer cylinder 32 through only one set of the circular frame 54 and cross braces 71, a second set of the circular frame 54 and cross braces 71 may be arranged adjacent to the stationary frame 53 at the left side of FIG. 3 in the opening between the short cradle carrying the battery 57 and the long cradle carrying the platform 56 and storage area 64. Alternatively, instead of being placed at the right side of FIG. 3 adjacent to the stationary frame 53, the circular frame 54 and the cross braces 71 may be centered equidistant between the two stationary frames 53 shown at both ends of the safety vehicle 10. Of course, if such arrangement is the case, the cradle carrying the platform 56 and the two adjacent cradles carrying the batteries 57 at both ends thereof must necessarily be divided into two separate cradles carrying two separate platforms 56 and each carrying a single battery 57.

In any event, the scope of the invention is intended to be covered by both the letter and the spirit of the claims appended hereto.

We claim:

1. A multidirectional amphibious safety vehicle, comprising:
   an outer cylindrical shell having two opposite ends and a longitudinal axis therethrough;

a stationary central pipe having two opposite ends and extending along the longitudinal axis of the outer cylindrical shell;

means, secured around the central pipe, for rotating the outer cylindrical shell about the central pipe so that the safety vehicle moves forward and backward over land, water, and other terrain;

motor means, mounted on at least one of the two opposite ends of the central pipe, for driving the safety vehicle sideways on water;

auxiliary wheel means, mounted on the two opposite ends of the central pipe, for providing balance whenever the safety vehicle travels over land and other terrain; and sail means, mounted on the two opposite ends of the central pipe, for driving the safety vehicle sideways on water.

2. The safety vehicle, according to claim 1, further comprising:

float and pontoon means, mounted on the two opposite ends of the central pipe, for providing balance whenever the safety vehicle travels on water.

3. The safety vehicle, according to claim 1, further comprising:

tiltable keel means, fixed to the outer cylindrical shell, for guiding the safety vehicle whenever the safety vehicle moves sideways on water.

4. The safety vehicle, according to claim 1, further comprising:

a plurality of corrugations arranged along the exterior of the outer cylindrical shell.

5. The safety vehicle, according to claim 4, further comprising:

spike means, secured to each of the plurality of corrugations, for assisting movement whenever the safety vehicle travels over other terrain, such as ice and snow.

6. The safety vehicle, according to claim 1, wherein said rotating means includes:

a circular frame attached to an inner periphery of the outer cylindrical shell, a plurality of diagonal brace means for securing the circular frame around the central pipe, and a lever means for controlling rotation of the circular frame and the plurality of diagonal brace means.

7. The safety vehicle, according to claim 1, further comprising:

means, arranged between the central pipe and the outer cylindrical shell, for counterbalancing any rotation of the outer cylindrical shell so that the central pipe remains stationary.

8. The safety vehicle, according to claim 7, wherein said counterbalancing means includes:

a plurality of idle roller means for rotating against an inner periphery of the outer cylindrical shell; and a plurality of stationary frames for spacing the plurality of idle roller means from the central pipe.

9. The safety vehicle, according to claim 1, further comprising:

two hemispheric dome means, secured near the two opposite ends of the central pipe, for closing the two opposite ends of the outer cylindrical shell.

10. The safety vehicle, according to claim 1, further comprising:

block and tackle means, attached to the two opposite ends of the central pipe, for lowering the safety vehicle from a larger structure.

* * * * *